C. HOWLETT.
Pendulum Scales.
No. 35,155.
Patented May 6, 1862.
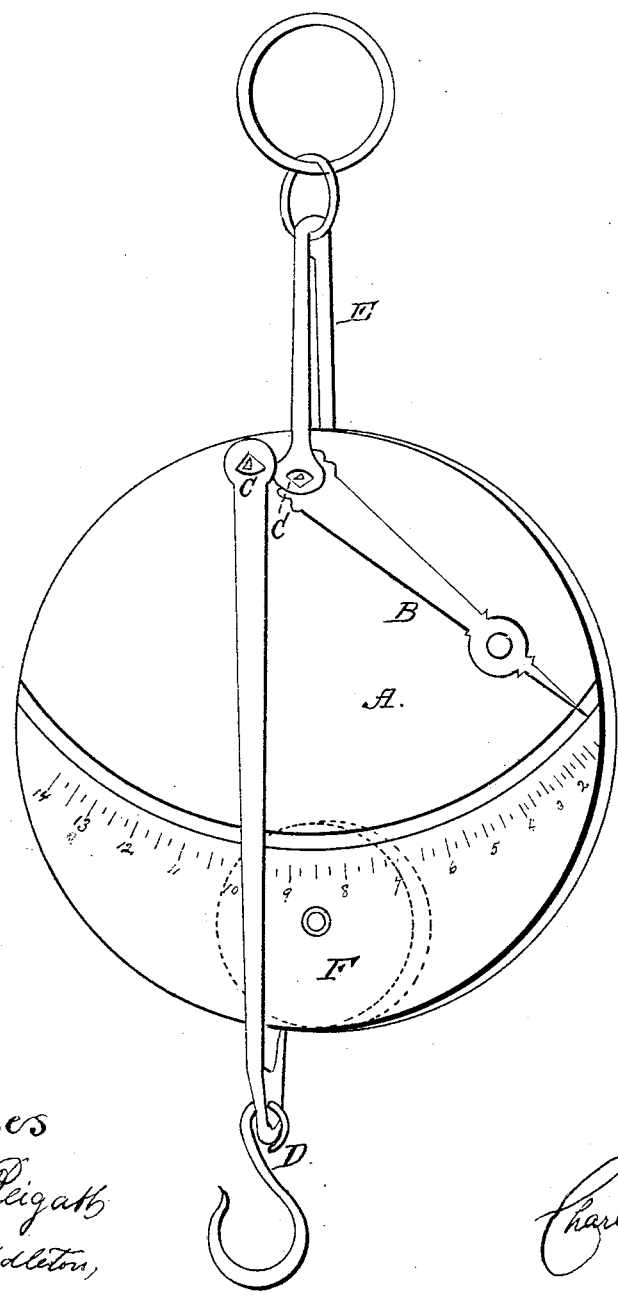
Witnesses
O. Franklin Reigate
R. S. Middleton
Inventor
Charles Howlett.

UNITED STATES PATENT OFFICE.

CHARLES HOWLETT, OF HARTFORD, CONNECTICUT.

IMPROVEMENT IN BALANCES.

Specification forming part of Letters Patent No. 35,155, dated May 6, 1862.

*To all whom it may concern:*

Be it known that I, CHARLES HOWLETT, of Hartford city, Connecticut, have invented new and useful Improvements in Self-Indicating Balances for Weighing Purposes; and I do hereby declare that the following is a full and exact description thereof, reference being had to the accompanying drawings, and to the letters of reference marked thereon.

The following is the description.

To enable others to make and use my invention I thus describe it.

A represents a metal movable plate with indicator B, and scale graduated from the center of bearing at the point C. The indicator being attached at point C, the plate moves upward past the indicator until the article weighed attached to hook D brings the figure opposite the point of indicator, the hook D being attached to the plate on the right of the upper hook, E, and of the bearing-point C.

The advantage is that this is self-indicating, the point of indication being below the bearing-point instead of above, as in the ordinary balances, and the plate, after the article weighed is removed, always returns to its original central position, the plate falling back until the index-point is at the zero or naught. F is a weight attached to the back side of the plate A, which regulates the capacity of the scale.

The two bearing-points C C are angular-shaped and operate in the eyes of hooks D and E.

What I claim as my invention, and desire to secure by Letters Patent, is—

The combination of the bearing-points C C, weight F, and indicator B, arranged as a self-indicating balance, substantially as herein described.

CHARLES HOWLETT.

Witnesses:
J. FRANKLIN REIGART,
R. S. MIDDLETON.